United States Patent
Thompson

[15] 3,642,460
[45] Feb. 15, 1972

[54] PROCESS FOR THE PRODUCTION OF A METHANE-CONTAINING GAS

[72] Inventor: Brian Hoyle Thompson, Solihull, England
[73] Assignee: The Gas Council, London, England
[22] Filed: Apr. 25, 1969
[21] Appl. No.: 819,375

[30] Foreign Application Priority Data

May 3, 1968 Great Britain......................21,186/68

[52] U.S. Cl..................................48/214, 48/197, 48/213, 260/449 M
[51] Int. Cl...........................................................C07c 9/04
[58] Field of Search................48/214, 213, 197; 260/449 M, 260/449.6 M

[56] References Cited

UNITED STATES PATENTS

| | | | |
|---|---|---|---|
| 2,738,262 | 3/1956 | Benz et al. | 48/213 X |
| 3,420,642 | 1/1969 | Percival | 48/214 |
| 3,450,514 | 6/1969 | Sinfelt et al. | 48/214 |
| 3,469,957 | 9/1969 | Percival et al. | 48/214 |
| 3,511,624 | 5/1970 | Humphries et al. | 48/214 X |

FOREIGN PATENTS OR APPLICATIONS 820,257 9/1959 Great Britain..........................48/214

*Primary Examiner*—Joseph Scovroner
*Attorney*—Watson, Cole, Grindle & Watson

[57] ABSTRACT

A gas containing a high proportion of methane (e.g. 90 percent or more) is produced by (i) reacting a preheated mixture of steam and the vapor of a predominantly paraffinic hydrocarbon feedstock having a final boiling point of not more than 300° C. in the presence of a steam-reforming catalyst to give a gas containing methane, hydrogen, carbon oxides and undecomposed steam, the reaction zone being cooled by a heat exchanger; (ii) reacting the stage (i) product gas in the presence of a methanation catalyst to increase the methane concentration, the reaction zone being cooled by a heat exchanger, and (iii) removing steam and optionally carbon dioxide from the gas leaving stage (ii). Both stages are operated at as low a temperature as possible to maximize the production of methane. The heat exchangers are preferably fluid-cooled internal heat exchangers. The fluid coolant may be water or steam. Water may be used in stage (iii) to remove (by cooling) steam; passed into the stage (ii) heat exchanger and converted into steam; passed into the stage (i) heat exchanger; and then used as the process steam.

7 Claims, 1 Drawing Figure

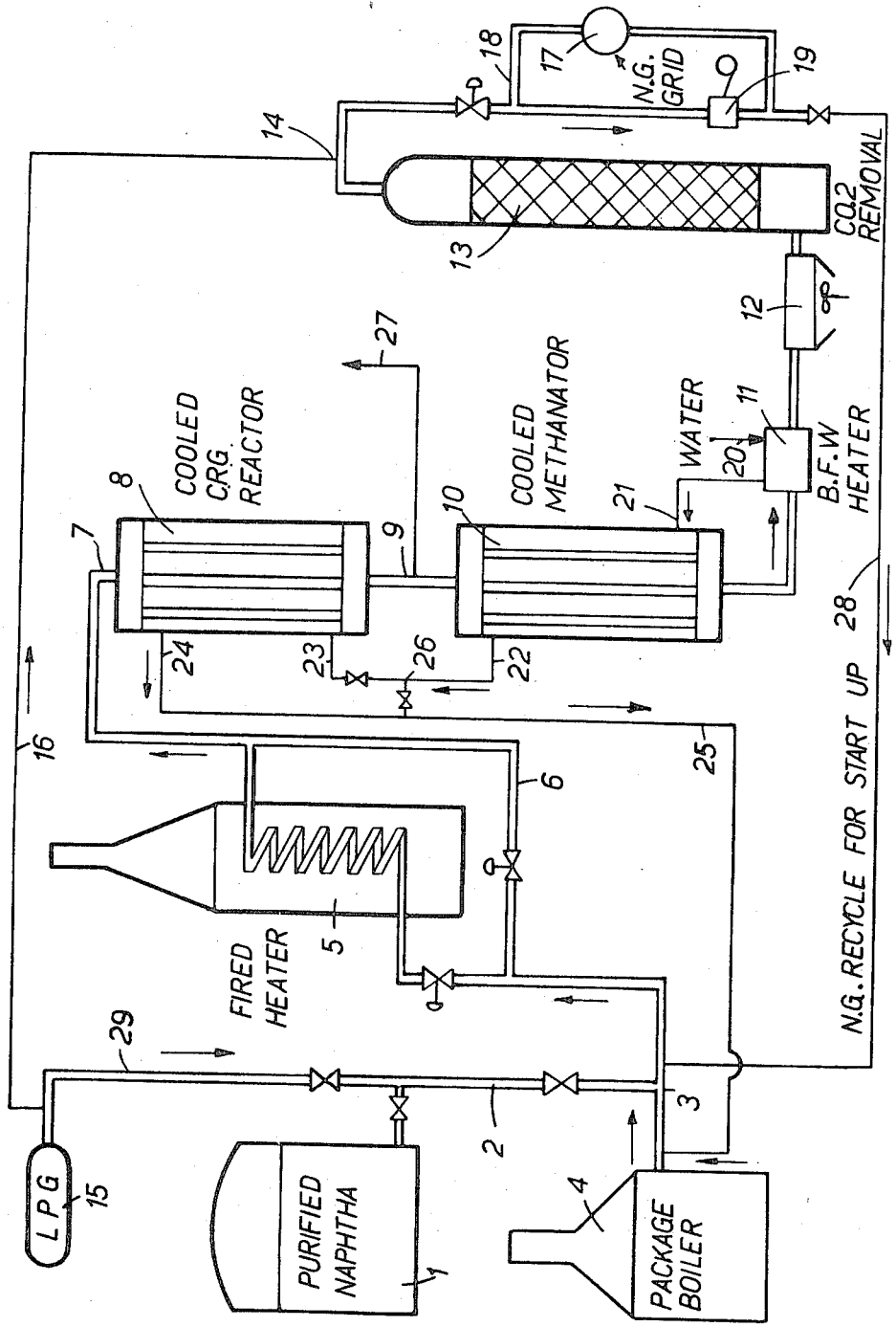

PROCESS FOR THE PRODUCTION OF A METHANE-CONTAINING GAS

This invention relates to a process for the production of a gas containing a high proportion of methane, in particular, a gas consisting substantially of methane (so that it is similar to or interchangeable with natural gas and can be introduced into a natural gas transmission system), by catalytic synthesis from the methane-rich gas produced by the low-temperature gasification of light petroleum oils (for instance, light petroleum distillate) in steam.

A preferred process for the low-temperature gasification of light hydrocarbons (for instance, light petroleum distillate or naphtha) is described and claimed in our British Patent Specification No. 820,257. The process comprises passing a mixture of predominately paraffinic hydrocarbons and steam in vapor form at a temperature above 350° C. through a bed of nickel catalyst under atmospheric or superatmospheric pressure such that the bed is maintained by the reaction at temperatures within the range of 400° C. to 550° C.

The catalyst employed may be a nickel-alumina catalyst formed by coprecipitation of nickel and aluminum salts followed by reduction of the nickel in the mixture to the metallic state, to which catalyst is added a minor proportion of an oxide, hydroxide or carbonate of an alkali or alkaline earth metal. The preheat temperature of the reactants may be as high as 600° C., in which case the catalyst bed temperature may rise above 550° C. Methods are known for increasing the life of the catalyst by increasing the proportion of steam and hydrogen in contact with it.

The resulting gases contain steam, hydrogen, carbon oxides (more $CO_2$ than $CO$) and a substantial proportion of methane. This proportion may be increased by methanation at a lower temperature. Thus, the methane-rich gas produced by the process of Specification No. 820,257 may be subjected to the action of a nickel catalyst at a lower temperature, for example, at 400° C. or below, to bring about the formation of methane by reaction between carbon dioxide, carbon monoxide and hydrogen present in the gas.

The present invention relates to a particular process for performing the steps thus described, aimed especially at the production of gas consisting (after removal of steam and carbon dioxide) substantially wholly of methane.

The invention provides a process for the production of a gas containing a high proportion of methane which process comprises (i) introducing a preheated mixture of steam and the vapor of a predominately paraffinic hydrocarbon feedstock having a final boiling point of not more than 300° C. into a first catalytic reaction zone in which the mixture reacts in the presence of a steam-reforming catalyst to give a gas containing methane, hydrogen, carbon oxides and undecomposed steam, and which zone is cooled by a heat exchanger; (ii) introducing the stage (i) product gas into a second catalytic reaction zone in which the constituents of the gas react in the presence of a methanation catalyst to increase the methane concentration, and which zone is cooled by a heat exchanger; and (iii) removing steam and optionally carbon dioxide from the gas leaving the stage (ii).

By a high proportion of methane is meant a high proportion calculated on the dry carbon-dioxide-free basis.

The gas removed from the second catalytic reaction zone is cooled so that the undecomposed steam condenses and can be removed. A high proportion of the carbon dioxide content of the product gas is then preferably removed, leaving a gas containing a high proportion of methane, together with residual hydrogen and carbon dioxide. If the final synthesized gas is to be introduced into a transmission line conveying natural gas, which natural gas is of significantly different composition and combustion properties from the synthesized gas (for instance, by virtue of containing higher hydrocarbons), it may be desirable to add light petroleum gas (L.P.G.) to the synthesized gas before introducing it into the transmission line, so as to make it completely interchangeable with the natural gas.

The final product gas will usually contain at least 90 percent, and preferably 98 percent by volume of methane on the dry carbon-dioxide-free basis.

Internal heat exchangers are preferably used. An alternative arrangement is to have the catalyst in tubes, with the cooling medium outside, all within a pressure vessel. A further alternative is to jacket the entire catalyst bed with a space containing the coolant.

In the first catalytic reaction zone, the lower the temperature and the higher the pressure at which the reaction is carried out the higher is the methane content of the product gas. Thus, the reaction is preferably initiated on the catalyst at the lowest practicable temperature consistent with the feedstock remaining fully vaporized and the temperature of at least a part of the catalyst bed, and especially of that part of the bed which is nearest to the outlet end, is preferably maintained by the cooling system at a temperature below that at which the mixture of feedstock and steam is introduced into the reaction zone. In order to ensure the establishment of the gasification reactions, it may be advantageous to arrange for the inlet portion of the catalyst bed to be outside the region which is cooled by the heat exchanger, for example, in a downward-flow system, by placing a layer of catalyst above the level of the top of the heat exchanger.

The steam-reforming catalysts suitable for use in the first catalytic reaction zone are well known. For example, the catalyst may be a coprecipitated nickel-alumina catalyst containing an alkali metal or alkaline earth metal, examples of which are described in our British Specification No. 969,637 or in our British Patent No. 1,150,066. Alternatively, catalysts containing a high proportion of an alkaline earth metal (especially barium), for instance, as described in our U.S. application, Ser. No. 567,391, filed July 25, 1966, Patent No. 3,515,527, granted June 2, 1970, may be used, but they are not preferred. Before being introduced into the first catalytic reaction zone, the mixture of feedstock vapor and steam has to be preheated to a temperature which, in combination with the catalyst bed temperature, enables the reaction to proceed.

In general, the mixture of feedstock vapor and steam should be preheated to a temperature which is no higher than is necessary for the maintenance of the hydrocarbon in the completely vaporized state and for the initiation of the reactions on the catalyst. With typical catalysts known for the low-temperature gasification of hydrocarbons in steam, as indicated hereinbefore, such a temperature is 400° C. or above. It should not be necessary for the temperature to exceed 500° C, and preferably it will be below about 450° C. The catalyst bed temperature will generally be from 400° C to 550° C, preferably 400° C to 500° C.

The outlet temperature is preferably maintained by the cooling system at a temperature below the inlet temperature. Thus, the temperature of the catalyst bed may fall progressively from the inlet to the outlet. Alternatively, especially if the catalyst nearest to the inlet is not within the region that is cooled, the bed temperature may pass through a maximum due to the exothermicity of the gasification reactions under the operating conditions of the present invention. Thus, at the lowest inlet temperatures, the temperature rise will be such that the maximum will in general be less than 100° C. above the inlet temperature, and the magnitude of the rise will decrease as higher inlet temperatures are used.

In order to avoid the deposition of carbon on the steam-reforming catalyst, it is necessary for the proportion of steam relative to the hydrocarbons to be greater than that which enters into reaction. The excess of steam required for this purpose depends on the average molecular weight of the hydrocarbons used. However, the excess is not great, and about 2 parts by weight of steam to one part by weight of hydrocarbons can be used with all mixtures of hydrocarbons containing an average of four to 10 carbon atoms per molecule; a larger proportion, up to 5 parts by weight of steam to 1 part by weight of hydrocarbons, may be used if desired. In the case of hydrocarbons containing an average of four to seven carbon atoms, the proportion of steam may be as low as 1.5 parts by weight.

In the methanation reaction, which takes place in the second catalytic reaction zone, the formation of methane is favoured by a low temperature and high pressure. The reaction is preferably brought to equilibrium at the lowest possible temperature at which the methanation catalyst is capable of acting.

In order that methane shall be synthesised in the second zone from the gases produced in the first zone it is necessary that, notwithstanding the exothermicity of the reactions in both zones, the temperature at least of the outlet end of the second catalytic reaction zone shall be less than that of the outlet end of the first catalytic reaction zone.

Any methanation catalyst active for low-temperature methanation may be used in the second catalytic reaction zone. A suitable catalyst is a coprecipitated nickel-alumina catalyst which is rich in nickel. The temperature of the methanation catalyst will generally be within the range 200°–450° C., and, as has been stated above, the temperature is preferably the lowest at which it is possible to bring the system to equilibrium. Thus, the outlet temperature is preferably below 300° C., e.g., 200° to 250° C., and is conveniently about 225° C. The inlet temperature is preferably about 350° C.

The process of the invention can be operated by cooling the first catalytic reaction zone by passing through the heat exchanger a coolant fluid removed from the heat exchanger of the second catalytic reaction zone. For example, the coolant fluid can first be used to cool the product gas leaving the second catalytic reaction zone, then be passed through the heat exchanger of the second catalytic reaction zone to cool that zone, and then be passed through the internal heat exchanger of the first catalytic reaction zone to cool that zone.

In the preferred manner of carrying out the process of the invention, the coolant fluid is water or steam. In the preferred process, water is used to cool the product gases leaving the second catalytic reaction zone, and this water is thereafter passed through the (preferably internal) heat exchanger of the second catalytic reaction zone to cool that zone. The heat exchanger in the second catalytic reaction zone acts as a boiler, and steam is produced. All or part of this steam leaving the heat exchanger of the second catalytic reaction zone may then be passed into the (preferably internal) heat exchanger of the first catalytic reaction zone, wherein it is itself heated while it cools the zone. The heated steam may then be removed from the heat exchanger in the first catalytic reaction zone, and used as part of the process steam.

The use of the coolant steam as at least part of the process steam can lead to the advantage that an overall system is self-regulating as regards the temperatures of the catalyst beds. For example, if any disturbance of operating conditions caused more heat to be liberated so that the temperature tended to rise, more heat would be imparted to the cooling system and the quantity of steam generated would be increased. Thus the quantity of reactant steam would be increased, and this would have the effect of lowering the amount of heat liberated by the reactions, thus restoring operating conditions to their prescribed state.

The feedstock is preferably one which has an initial boiling point at atmospheric pressure of not less than 30° C. and a final boiling point of not more than 200° C., preferably not more than 150° C. The preferred feedstock is low-boiling naphtha.

Before the feedstock can be used in the process of the invention, it has to be purified with respect to sulphur to avoid catalyst poisoning. This may be effected by a hydrodesulphurisation process. A hydrogen-containing gas for use in a hydrodesulphurisation process may be withdrawn from between the first and second catalytic reactors (which provide the two reaction zones). If a conventional purification process is used, it is desirable to remove at least some of the carbon dioxide present in this gas before it can be used in the hydrodesulphurisation process; but the gas is suitable for direct use in the purification process of commonly owned Ser. No. 809,016, filed Mar. 20, 1969, by J. A. Lacey, "Purification of Hydrocarbon Oils". If it is not desired to make this provision for the removal of a hydrogen-containing gas, the two catalytic reactors can be combined into a single vessel. On the other hand temperature control is best retained by keeping the two cooling systems separate.

The catalyst beds in both instances may either be static or fluidized.

The pressures at which the process of the invention can be carried out are well known. The pressure is preferably above atmospheric pressure, for example within the range 5–100 atmospheres or higher. A convenient pressure to work at is about 70 atmospheres, so that the final product gas can be directly admitted to a natural gas transmission system.

The pressure in the cooling system is preferably sufficiently above the process operating pressure to enable the steam to be admitted to the feedstock without the use of special admission devices.

The process of the invention will be illustrated with reference to the accompanying drawing, which is a flow diagram of a self-contained plant for making substitute natural gas and feeding it into a high-pressure transmission grid.

In the drawing, purified naphtha, either as liquid or vapor, is made available at 1 and is supplied via pipe 2 to point 3 where it meets a stream of steam supplied from 4, which can be the outlet of a packaged boiler. If the naphtha is supplied as liquid it evaporates in the stream of steam and if necessary the evaporation may be completed in the heater 5, which also serves to preheat at least part of the mixture. The bypass 6 enables the mixture of naphtha vapor and steam to be delivered to the inlet 7 of the first catalytic reactor 8. Reactor 8 is provided with an internal cooling system in the form of a heat exchanger, the function of which will be described below.

In reactor 8 the naphtha is completely converted, in the presence of a steam-reforming catalyst, to gas so that there emerges from the outlet 9 a mixture of hydrogen, carbon monoxide and dioxide, methane and steam which is normally at equilibrium at the temperature of the outlet of the catalyst, which is preferably maintained by the cooling system at a temperature below that of the inlet.

The gas mixture then enters a second reactor 10, a catalytic methanator, also provided with internal cooling. The gases undergo methanation which, with the aid of a catalyst active for low-temperature operation and of the cooling system, proceeds so that the gases are brought to a composition which corresponds with equilibrium at the lowest possible temperature.

The outlet gas from 10 is cooled in the heat exchanger 11 and the fanned cooler 12: condensate is removed by a drain (not shown) and carbon dioxide is removed by any convenient known means in the tower 13. If necessary, the composition, calorific value and Wobbe Index of the final gas can be adjusted, by the addition of L.P.G. at 14 from source 15 by a pipe 16 before it is admitted to the natural gas grid 17, either directly via 18 or with the aid of a compressor 19.

Preferably, the heat exchanger 11 is used to heat water which enters at 20 and then flows via 21 to the cooling system of the methanator vessel, which acts as a boiler. Steam issuing at 22 flows through the cooling system of the reactor 8, entering at 23 and leaving at 24, and then passes via 25 to the inlet of the process steam supply at 4. If desired, some of the steam may bypass the reactor 8 through valve 26.

If desired, a stream 27 of hydrogen-containing gas may be withdrawn from between the first and second catalytic reactors and used for a hydrodesulphurisation process of purification of the naphtha.

A supply of natural gas from the grid can be brought via pipe 28 to the inlet of the apparatus for startup purposes. L.P.G. may also be supplied as gasification feedstock, through pipe 29.

It is a feature of the system that it can be self-regulating as regards the temperatures of the catalyst beds. If, for example, any disturbance of operating conditions were to cause more heat to be liberated so that the temperatures tended to rise, more heat would be imparted to the cooling system and the quantity of steam generated and supplied through pipe 25 would be increased. This would have the effect of lowering the amount of heat liberated by the reactions, thus restoring operating conditions.

The following data were obtained using the plant described above.

EXAMPLE 1

| Condition No. | 1 | 2 | 3 |
|---|---|---|---|
| Pressure, atm. | 25 | 25 | 70 |
| Naphtha characterization | L.D.F. 115 | L.D.F 115 | L.D.F. 115 |
| Steam/naphtha ratio at inlet first reactor, lb. per lb. | 2.0 | 1.6 | 1.5 |
| Temperature at inlet first reactor, °C. | 450 | 450 | 400 |
| Percentage of process steam raised in cooling system | 42 | 49 | 38 |
| Temperature of methanator outlet, °C. | 225 | 225 | 285 |
| Composition of wet gas leaving methanator, percent by volume | | | |
| $CO_2$ | 10.6 | 12.4 | 13.0 |
| CO | 0.0 | 0.0 | 0.0 |
| $H_2$ | 0.2 | 0.2 | 0.3 |
| $CH_4$ | 36.3 | 42.6 | 44.6 |
| $H_2O$ | 52.9 | 44.8 | 42.1 |
| Total: | 100.0 | 100.0 | 100.0 |
| Properties of final gas, dry, carbon dioxide removed, (1-percent residual) before L.P.G. enrichment: Composition, percent by volume: | | | |
| $CO_2$ | 1.0 | 1.0 | 1.0 |
| CO | 0.0 | 0.0 | 0.0 |
| $H_2$ | 0.55 | 0.4 | 0.7 |
| $CH_4$ | 98.45 | 98.6 | 98.3 |
| Total: | 100.0 | 100.0 | 100.0 |
| Calorific Value, Btu./ft.³ | 978 | 979 | 977 |
| Specific gravity (air = 1) | 0.557 | 0.558 | 0.556 |
| Wobbe Index | 1311 | 1311 | 1310 |

EXAMPLE 2

In the experiments described below, the catalyst used in both the first reactor and the methanator was coprecipitated nickel-alumina catalyst prepared generally as in British Specification No. 969,637, containing approximately 75 percent of nickel (calculated as metal) and 1 percent of potassium (calculated as metal) which has been added as potassium carbonate (the percentages being of the total of the nickel, alumina and potassium in the catalyst)

| Experiment No. | 1 | 2 | 3 |
|---|---|---|---|
| Pressure, atmospheres absolute | 24.1 | 24.1 | 24.4 |
| Naphtha characterisation: | LDF 115 | LDF 115 | LDF 115 |
| (Specific gravity (60° F./60° F.) | 0.683 | 0.683 | 0.683 |
| Steam/naphtha ratio at inlet first reactor, lb per lb | 2.06 | 1.89 | 1.57 |
| Temperature at inlet first reactor, °C. | 452 | 451 | 451 |
| Temperature of methanator outlet, °C. | 277 | 287 | 246 |
| | 1 | 2 | 3 |
| Composition of wet gas leaving methanator, percent by volume: | | | |
| $CO_2$ | 10.0 | 10.7 | 12.2 |
| CO | 0.0 | 0.05 | 0.0 |
| $H_2$ | 1.25 | 1.25 | 0.8 |
| $CH_4$ | 34.85 | 37.8 | 42.85 |
| $H_2O$ | 53.9 | 50.2 | 44.15 |
| Total: | 100.0 | 100.0 | 100.0 |
| Properties of final gas, dry, carbon dioxide removed (1 percent-residual), before L.P.G. enrichment Composition, percent by volume: | | | |
| $CO_2$ | 1.0 | 1.0 | 1.0 |
| CO | 0.0 | 0.05 | 0.0 |
| $H_2$ | 3.45 | 3.15 | 1.85 |
| $CH_4$ | 95.55 | 95.8 | 97.15 |
| Total: | 100.0 | 100.0 | 100.0 |
| Calorific value, Btu./ft.³ | 959 | 960 | 969 |
| Wobbe index | 1295 | 1295 | 1300 |
| Wobbe index after enrichment with propane to a calorific value of 1,000 Btu./ft.³ | 1318 | 1319 | 1317 |

The designation "LDF" refers to the result of applying method No. IPC 123/64, Institute of Petroleum, "Standard Methods of Test for the Distillation of Petroleum Products," to samples of light petroleum distillate. The method is a standard side-arm distillation and the temperature of the vapor is measured immediately before it enters the side-arm to reach the condenser. When a light petroleum distillate designated L.D.F. T° C. is submitted to this test, not less than 95 percent by volume of the initial distillate shall have been condensed and collected in the receiver when the temperature at the inlet to the side-arm has reached T° C. T° C. is generally a few degrees centigrade lower than the final boiling point as observed in the same test.

I claim:

1. A process for the production of a gas containing at least 90 percent by volume of methane on a dry carbon-dioxide-free basis, which process comprises:

i. preheating to a temperature of 400° to 500° C. a reactant mixture of steam and the vapor of a predominately paraffinic hydrocarbon feedstock having a final boiling point of not more than 300° C. and introducing the preheated mixture into a first catalytic reaction zone in which the mixture reacts in the presence of a fixed bed of a steam-reforming catalyst at a temperature of 400° C. to 550° C. to give a gas containing methane, hydrogen, carbon oxides and undecomposed steam, cooling said zone by an internal heat exchanger the outlet of the catalyst bed being maintained by the heat exchanger at a temperature below that at which the reactant mixture is introduced into the zone;

ii. introducing the stage (i) product gas into a second catalytic reaction zone in which the constituents of the gas react in the presence of a fixed bed of a methanation catalyst at a temperature of 200° C. to 450° C. to increase the methane concentration and cooling said second zone by an internal heat exchanger;

iii. removing steam from the gas leaving stage (ii) by cooling the gas with water; and iv. passing the water which has been used to cool the gas in stage (iii) through the heat exchanger of the second catalytic reaction zone to cool that zone and to convert the water into steam; passing at least part of the steam removed from the heat exchanger of the second catalytic reaction zone through the heat exchanger of the first catalytic reaction zone to cool that zone; and using at least part of the steam removed from the heat exchanger of the first catalytic reaction zone as the process steam in the reactant mixture.

2. A process as claimed in claim 1 wherein the reaction in stage (i) is initiated on the catalyst at the lowest practicable temperature consistent with the feedstock remaining fully vaporised.

3. A process as claimed in claim 1 wherein that portion of the catalyst bed beyond the inlet portion in stage (i) is cooled by the heat exchanger.

4. A process as claimed in claim 1 wherein the catalyst in stage (i) is coprecipitated nickel-alumina catalyst containing a member selected from the group consisting of the alkali metals and the alkaline earth metals.

5. A process as claimed in claim 1 wherein the outlet temperature of the catalyst in stage (ii) is maintained by the heat exchanger at the lowest temperature at which the catalyst is capable of acting.

6. A process as claimed in claim 1 wherein the catalyst in stage (ii) is a coprecipitated nickel-alumina methanation catalyst.

7. A process as claimed in claim 1 wherein the outlet temperature in stage (ii) is 200° C to 250° C.

* * * * *